Aug. 22, 1967  A. BENJAMIN  3,336,614
THREAD-CUTTING TAP AND METHOD OF PRODUCING IT
Filed April 15, 1965  3 Sheets-Sheet 2
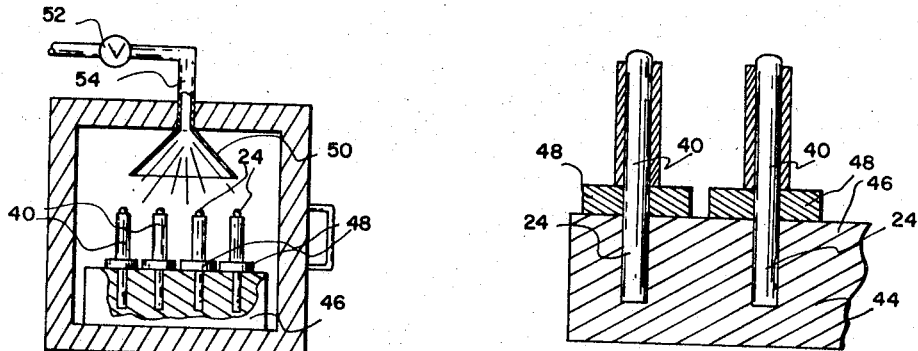
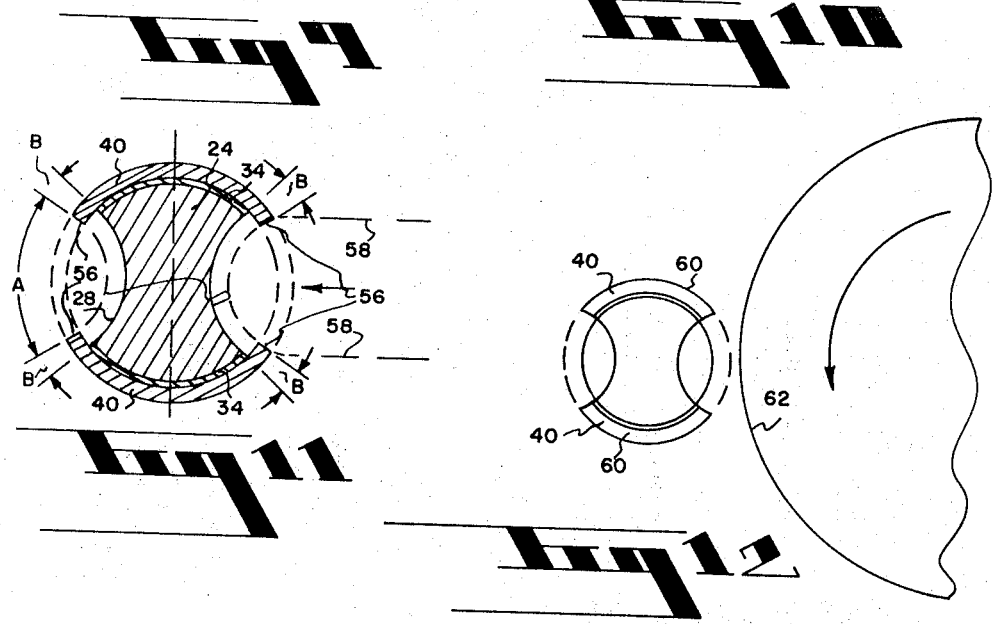
INVENTOR
ALLEN BENJAMIN
BY
Wm. H. Dean

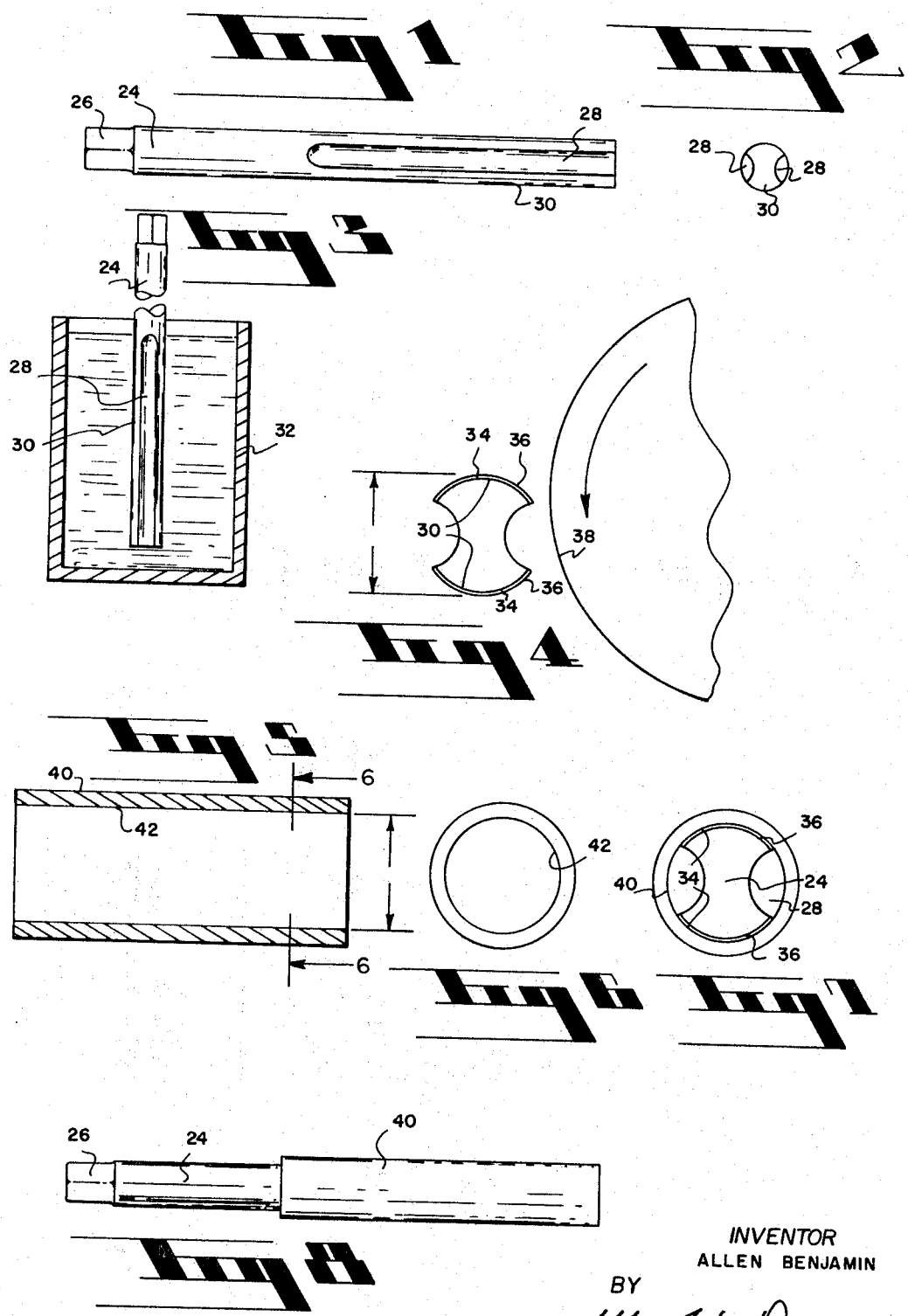

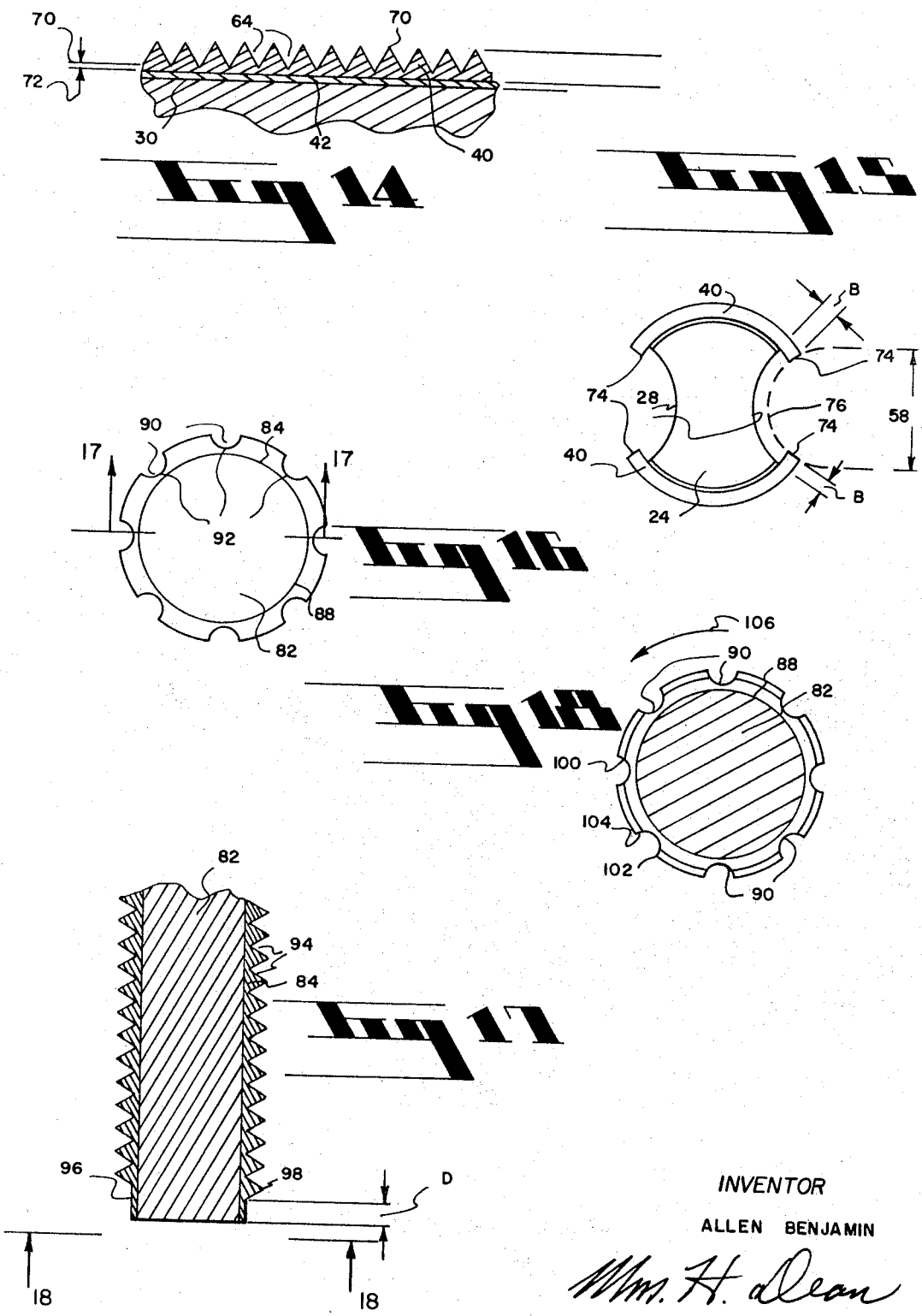

United States Patent Office 3,336,614
Patented Aug. 22, 1967

3,336,614
THREAD-CUTTING TAP AND METHOD OF
PRODUCING IT
Allen Benjamin, 3018 N. 53rd Place,
Phoenix, Ariz. 85018
Filed Apr. 15, 1965, Ser. No. 448,522
15 Claims. (Cl. 10—141)

ABSTRACT OF THE DISCLOSURE

A thread-cutting tap and method of producing it, wherein tungsten carbide is secured by fusion or otherwise to the outside of a hard tough steel core, such that the tap may be driven by the steel core, and the thread-cutting portions of the tap are of tungsten carbide.

---

This invention relates to a thread-cutting tap and method of producing it, and more particularly, to a combination carbide high speed steel tap, or equivalent, and a method of producing composite tap structures having a hard thread-cutting structure of carbide, or equivalent material, carried by a very tough high speed steel core.

Various prior art hard-faced cutting tools have employed tough high speed steel body members and carbide or other hard-faced cutting edge structures secured thereto. Such hard cutting structures, as for example, tungsten carbide, must be sharpened by special grinding wheels such as the diamond faced wheels conventional to the art. These wheels, however, may be unduly worn if they are used to grind a high speed steel tool body concurrently with the sharpening of the hard carbide cutting face structures of such composite tools, as are now commonly used.

While there have been some prior art taps made of solid tungsten carbide, it is well known that solid carbide tools are frangible and will not stand much shock loading or such stresses as will tough high speed steel. In the specific structure of a tap, it is desirable that the thread-cutting thread structures of the tap be of hard material and that the body of the tap be strong and tough, and further, that the hard thread-cutting thread structures may readily be ground by a diamond faced wheel, without causing such a wheel to touch a high speed steel body and cause undue wear of the very expensive diamond faced wheel, which may be used to sharpen tungsten carbide or equivalent materials.

It has been a problem therefore, to construct or produce thread-cutting taps which will be durable in the cutting of threads in very hard materials and also taps which may readily be sharpened from time to time without the hazard of causing undue wear of expensive diamond faced grinding wheels. Further, it has been a problem to attain economical production of hard-faced taps, such that they may be produced with reasonable economy and structural excellence.

Accordingly, it is an object of the present invention to provide a novel carbide high speed steel tap and method of producing it, whereby very hard, tough and accurate taps may be produced at a reasonable price and which may also be resharpened without undue wear of expensive diamond faced grinding wheels.

Another object of the invention is to provide a thread-cutting tap in which a tough steel body is provided with longitudinal flute grooves and arcuate thread-cutting tap structure of relatively harder material are cantilevered beyond the sides of the flute grooves and disposed in overhanging relationship therewith, whereby the thread ends of the arcuate sections at the periphery of the tap are accessible for sharpening by diamond faced grinding wheel structures without causing these wheel structures to touch the tough steel body member of the tap, thus obviating the hazard of causing undue wear of a diamond faced grinding wheel while sharpening the hard material of the thread-cutting tap thread structures of the tap of the invention.

Another object of the invention is to provide a novel method for producing carbide high speed steel taps, or their equivalent, wherein an arcuate tungsten carbide structure is fused onto the outer periphery of a high speed steel tap blank concurrently with heat treatment of the steel blank.

Another object of the invention is to provide an economical method of producing very tough and strong taps capable of cutting threads in very hard material and capable of withstanding substantial torque and shock loading during the tapping of threads in holes in very hard materials.

Another object of the invention is to provide a novel thread-cutting tap structure in which a tough steel body is surrounded by relatively hard material in which thread-cutting tap thread structures are disposed and whereby the thread-cutting ends of the tap thread structures may readily be sharpened by a diamond faced grinding wheel without touching the relatively soft steel body of the tap.

Another object is to provide a novel method for producing a very efficient and tough multiple flute carbide high speed steel tap, which may be used as a multipurpose tap for initial threading and blind hole tapping.

Further objects and advantages of the present invention may be apparent from the following specification, appended claims and accompanying drawings, in which:

FIG. 1 is a side elevational view of a piece of high speed steel formed into a body or blank for use in producing a thread-cutting tap structure in accordance with the present invention;

FIG. 2 is an end view of the blank shown in FIG. 1;

FIG. 3 is an illustration of a method step utilized to plate a fusing or brazing layer of material into a tap body preliminary to the securement of brazing of a hardened arcuate section on the periphery of the body;

FIG. 4 is illustrates a next successive method step in which the plated brazing or fusing material is concentrically ground on the tap blank precisely to fit an internal bore of a sintered tungsten carbide sleeve;

FIG. 5 is a longitudinal sectional view of a tungsten carbide sleeve produced according to a method of the present invention;

FIG. 6 is an end view of the sleeve shown in FIG. 5;

FIG. 7 is an end view of the sleeve shown in FIG. 5 positioned over the periphery of the brazing or fusing alloy on the tap body, as shown in FIG. 4;

FIG. 8 is a side elevational view of the tap body, shown in FIG. 1, with the sleeve shown in FIG. 5 position thereon and in accordance with the showing of FIG. 7;

FIG. 9 is a vertical sectional view of a fusing and heat-treating furnace in which a plurality of tap body and sleeve assemblies, as shown in FIG. 8, are being fused together and heat-treated;

FIG. 10 is a sectional view of a carbon block utilized to hold the tap body and sleeve structures in juxtaposition during the fusion and heat-treating process disclosed in FIG. 9;

FIG. 11 is an enlarged cross sectional view of the tap body or blank with the hard sleeve fused thereon after it has been removed from the furnace, as shown in FIG. 9, and illustrating by broken lines the grinding of flutes in the sleeve in alignment with substantially conforming flutes in the body;

FIG. 12 illustrates a grinding method step successive to heat-treatment and fusion, as shown in FIG. 9, wherein the periphery of the hard sleeve is ground to a desired tolerance;

FIG. 13 is an illustration of a further method step in which threads are ground into the periphery of the hardened sleeve of the tap;

FIG. 14 is a fragmentary cross sectional view of the tap body and the hardened sleeve of the invention shown with threads ground therein and illustrating the layer of fusion material between the body and the sleeve and illustrating the depth of the threads ground therein with respect to the thickness of the sleeve;

FIG. 15 illustrates a further method step according to the method of the invention, wherein the ends of the threads shown in FIG. 14 are sharpened by a diamond faced grinding wheel without causing the wheel to touch the flute of the body member of the tap structure to avoid undue wear of the diamond faced grinding wheel;

FIG. 16 is an end view of a structure produced in accordance with the method of the invention and illustrating flute grooves ground in the hardened sleeve of the modified structure;

FIG. 17 is a fragmentary sectional view taken from the line 17—17 of FIG. 16 and showing details of the hardened sleeve, the threads cut therein, and a pilot structure on the end of the hardened sleeve to guide the tap threads into a hole in which threads are to be cut; and FIG. 18 is an end view of the tap structure shown in FIG. 17 and taken from the line 18—18 of FIG. 17.

In accordance with a method of the present invention, a high speed steel body or blank 24, as shown in FIGS. 1 and 2, is formed by any suitable machining or turning method. This blank may have a square stub 26 machined on one end and recessed flutes 28 are machined in the peripheral sides of the blank and are recesses inwardly of the periphery 30. Thus, the flute grooves 28 may provide thread sharpening clearance for diamond faced grinding wheels, as will be hereinafter described in detail.

The diameter of the peripheral portion 30 may be substantially less than the minor diameter of the thread-cutting tap threads of the invention, as will be hereinafter described.

The flute grooves 28 may be masked and subsequently, as shown in FIG. 3 of the drawings, the body 24 at its peripheral portion 30 may be plated with a suitable fusing alloy later to be employed in fusing a carbide sleeve on the periphery 30 of the blank 24. The plating process, shown in FIG. 3, involves a conventional tank 32, in which a chemical plating solution is disposed and in which the fluted portions of the blank 24 are immersed so that the peripheral portions 30 are provided with a thin plated layer 34 of fusible material, such as nickel, cobalt, or an equivalent, including silver, copper or alloys thereof, as may be desired. The plated layer 34 may be .001 inch thick, for example, and may then be ground so that peripheral portions 36 of the fusible alloy 34 may be ground by the periphery of a wheel 38 to a close diametrical tolerance, in order to fit closely in the bore of a tungsten carbide sleeve, as will be hereinafter described. A sintered tungsten carbide sleeve 40 is produced in hollow elongated cylindrical form and is provided with a bore 42 of precise diameter, so that it may be intimately fitted over the previously ground periphery 36 of the fusible material 34, shown in FIG. 4 of the drawings, such fit is preferably a conventional push fit, in order that a sufficiently close tolerance may be had between the peripheral portions 36 of the fusible material 34 and the bore 42, whereupon efficient whetting of fusion may take place between the periphery 30 of the blank 24 and the bore 42 of the sleeve 40 in order to fuse the sleeve 40 on the blank 24, as will be hereinafter described.

The bore 42 may be honed to precise tolerance, as hereinbefore described, and the sleeve 40 is then pressed onto the peripheries 36 of the fusible material 34, all as shown in FIG. 7 of the drawings. The assembly of the body 24 and sleeve 40 then appears, as shown in FIG. 8 of the drawings, and the assembly is then ready for combined heat-treatment and fusion of the sleeve 40 on the blank 24.

It will be understood that the wall thickness of the sleeve 40 externally of the bore 42 may be slightly thicker than the dimension between the minor and the major diameter of threads ultimately to be ground in the periphery of the sleeve 40.

As shown in FIGS. 9 and 10, the blanks 24 at their stub ends 26 are placed in recesses 44 of a carbon block 46 and carbon sleeves 48 are placed over the blank 24 below the sintered carbide sleeves 40 in order to support the assemblies of blanks and sleeves properly to extend above the carbon block 46, so that it may be placed in a furnace 50 and subjected to elevated temperature.

As shown in FIG. 9 of the drawings, and according to the method of the invention, the assemblies of sleeves 40 and blanks 24 are subjected to a critical temperature of the high speed steel of the blank 24. As for example, in a range between 1900 degrees Fahrenheit and 2375 degrees Fahrenheit, concurrently to fuse the sleeve 40 on the blank 24. As an example, when this fusion occurs and when electrolysis nickel is used as the fusible material 34, it may diffuse or amalgamate or alloy with the cobalt of the tungsten carbide sleeve 40 and this sleeve may at this time, become or be caused to reach a plastic condition. In this manner, the sleeve 40 is concurrently fused on the blank 24, while the high speed steel of the blank is subjected to its critical heat-treat temperature, which comprises an initial step in the heat-treatment of the blank 24 to render it very strong and tough. After the critical temperature of the steel has been reached and the fusible material 34 has been caused to fuse, a blast of gas, such as hydrogen, or an inert gas, may be used as a reducing and cooling atmosphere and may be introduced through a valve 52 and conduit 54 into the furnace 50 to cool the assemblies of sleeves and blanks 24 down to a temperature of approximately 1000 degrees, for example, whereby oxygen is excluded from the cooling atmosphere and, thus, oxidation of the parts is prevented during the initial cooling operation. After the parts have been cooled to approximately 1000 degrees Fahrenheit, or below, they are then removed from the furnace and permitted to cool about 250 degrees Fahrenheit to 450 degrees Fehrenheit and then the parts are reintroduced into the furnace and brought to a proper tempering temperature for the high speed steel, for example, 1025 degrees Fahrenheit. Following the tempering of the high speed steel, the assemblies are machined, as shown in FIG. 11 of the drawings, by cutting longitudinal flute openings 56 in the side walls of the sleeve 40 by means of a diamond faced grinding wheel 58, as indicated by dash lines in FIG. 11. The grinding wheel, being of such a contour that it does not touch the bottoms of the flute grooves 28 of the high speed steel blank and, thus, avoids undue wear on the diamond grinding wheel. Further, the grinding wheel 58 being of such dimension that it only grinds a flute opening 56 of a width, as indicated at A in FIG. 11, leaving extended or cantilever portions B of the respective sleeve 40, overhanging the edges or sides of the flute grooves 28 so as to provide clearance for the grinding wheel 58 as it may later be used to sharpen cutting ends of tap threads which may be machined in the periphery of the respective sleeve 40 as will be hereinafter described.

According to the method of the invention, and following the operation described in connection with FIG. 11 of the drawings, peripheral portions 60 of the sleeve 40 are ground by means of a diamond faced grinding wheel 62 to a desired diametric tolerance substantially coinciding with the major diameter of a thread later to be ground in the periphery of the sleeve 40.

The next step, according to the method of the invention, is illustrated in FIG. 13, wherein the blank 24 and sleeve 40 are rotated and helical threads 64 are ground in the periphery of the sleeve 40 by means of a diamond faced forming wheel 66 driven by a conventional powered arbor mechanism 68.

The threads 64, as shown in FIG. 14, have a major diameter periphery 70, the periphery 70 being the apex portions of the threads, while a minor diameter or root portions 70 of the threads may be spaced a distance 72 from the bore 42 of the sleeve 40 such that the minor diameter of the thread 64 is substantially greater than the peripheral diameter or a periphery 30 of the blank 24 and in this manner the periphery of the forming wheel 66, being a diamond faced wheel, does not touch the periphery 30 of the high speed steel blank 24 when the threads 64 are machined. Thus, undue wear or damage to the wheel 66 is avoided and a very efficient and smooth thread-cutting operation is attained in the hard tungsten carbide sleeve 40.

The next step of the method of the present invention involves the sharpening of the ends 74 of the threads 64 at ends of the cantilevered portions B, as hereinbefore described. The ends 74 being cantilevered over and extending and overlying the sides of the flute grooves 28, permit entrance of the diamond faced grinding wheel 58 such that its periphery 76 does not touch the flute grooves 28 of the high speed steel blank 24 and due to the cantilevered overhang of the portions B of the sleeve 40, no portion of the diamond faced grinding wheel 58 contacts the high speed steel blank 24 and, thus, undue wear or damage to the grinding wheel 58 is avoided. This cantilevered arrangement of the cantilevered portions B of the threads 64 permits resharpening of the cutting ends of the threads with accuracy and facility and compatibility with the grinding face of diamond faced wheels.

It will be appreciated by those skilled in the art that for the sake of appearance, the flute grooves 28 may be sandblasted to lend a mat finish thereto, following the grinding operation disclosed in FIG. 11, wherein the slots 56 or openings 56 are ground to communicate with the flute grooves 28.

As shown in FIG. 16, a modification of the invention includes a tungsten carbide sleeve 84 which is provided with a large plurality of flute grooves 90, directed longitudinally along the periphery and the periphery of the sleeve 84. These grooves 90 being provided with bottom portions 92, which are slightly spaced from the periphery 88 of the blank 82. Subsequent to the grinding of the flute grooves 90, peripheral helical threads 94 are ground in the periphery of the sleeve 84 in a manner similar to that described in FIG. 13, and in connection with the grinding of the threads 64, the threads 94 are ground to within almost the distance of one helical thread axially of the blank 82 as indicated at D in FIG. 17 of the drawings, and this distance D is ground to a tap hole dimension to provide a hole entering and aligning pilot portion 96 on the entrance end of the tap, shown in FIG. 19. The first helical thread 98 of the threads 94, is provided with a spiral relief, beginning at 100, as shown in FIG. 18, and ending at 102 so that a last cutting edge of the thread 98 is full diameter at 104, the cutting direction of the tap being as indicated by the arrow 106. Since there are a large plurality of the flute grooves 90 and inasmuch as each flute groove 90 presents a next successive cutting edge of the spiral relieved thread 98, the entire thread starting operation to reach from minor diameter to major diameter of the thread, may be accomplished in one helical turn of the tap. Thus, it will be appreciated that the tap, as shown in FIGS. 17 and 18, may function as a starting tap or a blind hole tap, and further, that precise operation of this tap is insured by alignment of the pilot portion 96 in the tap hole immediately ahead of the first thread 98 having its starting cut at 100 and its full major diameter finishing cut at 104, as shown in FIG. 18 of the drawings.

It will be appreciated by those skilled in the art that the hereinbefore described high speed steel tap bodies 24 and 82 are heat-treated in accordance with the present method to become very strong and tough with extremely high tensile strength and that the tungsten carbide sleeves in which the threads are cut are extremely hard and will cut very hard materials. Further, it will be appreciated that the method of the invention and the resulting tap product, greatly facilitates initial production in the grinding of the cutting portions of the tap threads, and further, in the resharpening thereof since the various portions to be ground by a diamond faced grinding wheel, never need contact any portion of the high speed steel body of the tap and thus, undue wear or damage to the diamond faced sharpening wheels or grinding wheels may not occur.

It will be obvious to those skilled in the art that various modifications of the present invention may be resorted to in a manner limited only by a just interpretation of the following claims.

I claim:

1. In a thread-cutting tap the combination of: an elongated generally circular in cross section steel body having a generally arcuate peripheral portion; a driving shank of said body; grooved portions disposed longitudinally in said body, said grooved portions recessed below said peripheral portion and communicating therewith; sides of said grooved portions disposed at said peripheral portion; and in cross section thread-cutting carbide thread structures secured to said peripheral portion; cutting ends of said thread structures cantilevered from said sides of said grooved portions and overlying said grooved portions to permit grinding of the ends of said thread structures for sharpening them without concurrently touching any of the surfaces of said grooved portions with a grinding medium.

2. In a thread-cutting tap the combination of: an elongated generally circular in cross section steel body having a generally arcuate peripheral portion; a driving shank of said body; grooved portions disposed longitudinally in said body, said grooved portions recessed below said peripheral portion and communicating therewith; sides of said grooved portions disposed at said peripheral portion; and arcuate in cross section thread-cutting carbide thread structures secured to said peripheral portion; cutting ends of said thread structures cantilevered from said sides of said grooved portions and overlying said grooved portions to permit grinding of the ends of said thread structures for sharpening them without concurrently touching any of the surfaces of said grooved portions with a grinding medium; said thread structures having minor diameter portions spaced radially outward from the peripheral portion of said steel body.

3. In a thread-cutting tap the combination of: an elongated steel body of circular cross section and having a peripheral surface; a hollow cylindrical sleeve of relatively harder material, said sleeve having a bore engaging and fixed to said peripheral surface of said steel body; a peripheral portion of said sleeve; a plurality of flute grooved portions in said peripheral portion of said sleeve, said flute grooved portions disposed generally longitudinally with respect to the longitudinal axis of said body and said sleeve; helical thread-cutting tap thread portions in the peripheral portion of said sleeve and intersecting said flute grooved portions in a substantially transverse relationship; said tap thread portions having major diameter apex portions and having minor diameter portions within said sleeve; said minor diameter portions spaced radially outward from the periphery of said steel body; innermost recessed portions of said flute grooved portions within said sleeve and also spaced radially outward from the periphery of said steel body.

4. In a thread-cutting tap the combination of: an elongated steel body of circular cross section and having a peripheral surface; a hollow cylindrical sleeve of relatively harder material, said sleeve having a bore engaging and fixed to said peripheral surface of said steel body; a peripheral portion of said sleeve; a plurality of flute grooved portions in said peripheral portion of said sleeve, said flute grooved portions disposed generally longitudinally with respect to the longitudinal axis of said body and said sleeve; helical thread-cutting tap thread portions in the peripheral portion of said sleeve and intersecting said flute grooved portions in a substantially transverse relationship; said tap thread portions having major diameter apex portions and having minor diameter portions within said sleeve; said minor diameter portions spaced radially outward from the periphery of said steel body; innermost recessed portions of said flute grooved portions within said sleeve and also spaced radially outward from the periphery of said steel body; said innermost recessed portions of said flute grooved portions being disposed at a shorter radius from the center of said body and said sleeve, than the respective radius of said minor diameter portions of said tap thread portions to provide chip clearance radially inward from said minor diameter portions of said tap threads.

5. In a thread-cutting tap the combination of: an elongated steel body of circular cross section having a peripheral surface; a hollow cylindrical sleeve of carbide material being relatively harder than said steel body, said sleeve having a bore engaging and fused to said peripheral surface of said steel body; a peripheral portion of said sleeve; a plurality of flute grooved portions in said peripheral portion of said sleeve, said flute grooved portions disposed generally longitudinally with respect to the longitudinal axis of said body and said sleeve; helical thread-cutting tap thread portions in the peripheral portion of said sleeve and intersecting said flute grooved portions in a substantially transverse relationship therewith; said tap thread portions having major diameter apex portions; minor diameter portions of said tap thread portions within said sleeve and spaced radially outward from the periphery of said steel body; innermost recessed portions of said flute grooved portions within said sleeve and also spaced radially outward from the periphery of said steel body; said innermost recessed portions of said flute grooved portions being disposed at a shorter radius, from the center of said body and sleeve, than the respective radius of said minor diameter portions of said tap thread portions to provide chip clearance radially inward from said minor diameter portions of said tap thread portions.

6. In a thread-cutting tap the combination of: an elongated generally circular in cross section steel body having a generally arcuate peripheral portion, a driving shank of said body; a grooved portion disposed longitudinally in said body; said grooved portion recessed below said peripheral portion; sides of said grooved portion disposed at said peripheral portion; and arcuate in cross section thread-cutting thread structures of material relatively harder than said steel body and secured to said peripheral portion of said steel body; cutting ends of said thread structures cantilevered from said sides of said grooved portions and overlying said grooved portions to permit grinding of the ends of said thread structures for sharpening them without concurrently touching any of the surfaces of said grooved portions with a grinding medium being used to sharpen the ends of said thread structures.

7. A method for producing thread-cutting taps consisting of: preparing an elongated generally circular in cross section steel blank, then placing a hollow cylindrical member of relatively harder material in surrounding relation with said blank, then subjecting said blank and said hollow cylindrical member to an elevated temperature and thereby concurrently fusing said hollow cylindrical member to the periphery of said blank and causing heat treatment of said blank, then grinding longitudinal flute grooves and helical thread-cutting tap threads in the periphery of said hollow cylindrical member outwardly beyond the periphery of said blank.

8. A method for producing thread-cutting taps consisting of: preparing an elongated generally circular in cross section steel blank, then placing a hollow cylindrical member of relatively harder material in surrounding relation with said blank, then subjecting said blank and said hollow cylindrical member to an elevated temperature and thereby concurrently fusing said hollow cylindrical member to the periphery of said blank and causing heat treatment of said blank, then grinding longitudinal flute grooves and helical thread-cutting tap threads in the periphery of said hollow cylindrical member outwardly beyond the periphery of said blank; without touching said blank with the grinding medium.

9. A method for producing thread-cutting taps consisting of: the preparation of a steel blank of generally elongated circular cross sectional shape, then cutting flute grooves longitudinally in the periphery of said blank, then surrounding said blank with a hollow cylindrical member of relatively harder material, then subjecting said blank and said hollow cylindrical member concurrently to an elevated temperature to fuse said hollow cylindrical member to the periphery of said blank and to heat treat said blank, then grinding flute grooves longitudinally through the side wall of said hollow cylindrical member outward of the flute grooves in said blank and leaving portions of said hollow cylindrical member extending beyond the edges of the flute grooves in said blank to provide cantilever extending portions of said hollow cylindrical member overlying the flute grooves in said blank and then grinding helical thread-cutting tap thread structures in the periphery of said hollow cylindrical member in intersecting relation with said overhanging cantilever portions, whereby subsequent sharpening of the ends of the thread structures at said cantilever overhanging portions may be accomplished without touching a grinding medium to the blank within the areas of said flute grooves in said blank.

10. A method for producing thread-cutting taps consisting of: producing an elongated generally circular in cross section steel blank, then plating the periphery of said blank with a fusible metal alloy, then surrounding said fusible metal alloy with a hollow cylindrical member of material relatively harder than that of said blank, then subjecting said blank and said hollow cylindrical member and said fusible metal to an elevated temperature for concurrently fusing said fusible metal to fuse connect said blank and said hollow cylindrical member and to concurrently heat-treat said blank, and then grinding flute grooves generally longitudinally in the peripheral portion of said hollow cylindrical member and grinding helical thread-cutting tap thread portions in a peripheral portion of said hollow cylindrical member outward of the periphery of said fusible material and said blank.

11. A method for producing thread-cutting taps consisting of: producing an elongated generally circular in cross section steel blank, then plating the periphery of said blank with a fusible metal alloy, then surrounding said fusible metal alloy with a hollow cylindrical member of material relatively harder than that of said blank, then subjecting said blank and said hollow cylindrical member and said fusible metal to an elevated temperature for concurrently fusing said fusible metal to fuse connect said blank and said hollow cylindrical member and to concurrently heat-treat said blank, said then grinding flute grooves generally longitudinally in the peripheral portion of said hollow cylindrical member and grinding helical thread-cutting tap thread portions in a peripheral portion of said hollow cylindrical member outward of the periphery of said fusible material and said blank; without touching the grinding medium to said fusible material or to said blank.

12. A method for producing thread-cutting taps consisting of: preparing an elongated generally circular in cross section steel blank and then surrounding said blank with a generally hollow cylindrical member having a bore in very close conformity with the periphery of said blank, then subjecting said blank and said hollow member to an elevated temperature and concurrently fusing said hollow cylindrical member onto said blank and heat-treating said blank and then grinding recessed flutes longitudinally in said hollow cylindrical member and helical thread-cutting tap thread structures in the peripheral portion of said hollow cylindrical member.

13. A method for producing thread-cutting taps consisting of: preparing an elongated generally circular in cross section blank, surrounding said blank with a hollow cylindrical sleeve of relatively harder material, then subjecting said blank and said hollow cylindrical member to elevated temperature and concurrently fusing said hollow cylindrical member onto the periphery of said blank and heating said blank to the critical temperature of the material therein, then subjecting said blank and said hollow cylindrical member to a blast of inert gas for cooling said blank and said hollow cylindrical member to a temperature below critical oxidizing temperature, then further permitting said blank and said hollow cylindrical member to cool to a degree substantially above atmospheric pressure, then again subjecting said blank and said hollow cylindrical member to a proper tempering temperature for said steel blank, then permitting said blank and said hollow cylindrical member to cool and then grinding in the periphery of said hollow cylindrical member longitudinal flute grooves and helical thread-cutting tap thread structures.

14. A method for producing carbide high speed steel taps consisting of: preparing an elongated generally circular in cross section high speed steel blank, then surrounding said blank with a hollow cylindrical structure of tungsten carbide, then subjecting said blank and said hollow cylindrical structure of tungsten carbide to an elevated temperature to fuse the cobalt in said tungsten carbide hollow cylindrical member and thereby cause fusion of said hollow cylindrical member to said blank and concurrently to cause heat-treatment of the high speed steel of said blank; and then grinding longitudinal flute grooves in the periphery of said hollow cylindrical member and grinding helical thread-cutting tap threads in the periphery of said hollow cylindrical member.

15. A method for producing thread-cutting taps consisting of: preparing an elongated generally circular in cross section steel blank and then surrounding said blank with a generally hollow cylindrical member of relatively harder material and having a bore in very close conformity with the periphery of said blank, then subjecting said blank and said hollow member to an elevated temperature and concurrently fusing said hollow cylindrical member onto said blank and heat-treating said blank and then grinding recessed flutes longitudinally in said hollow cylindrical member and helical thread-cutting tap thread structures in the peripheral portion of said hollow cylindrical member.

No references cited.

FRANCIS S. HUSAR, *Primary Examiner.*